United States Patent [19]

Heller et al.

[11] 3,935,902
[45] Feb. 3, 1976

[54] CONDENSATION APPARATUS FOR STEAM TURBINE POWER PLANTS

[75] Inventors: László Heller; László Forgó; János Bódás, all of Budapest, Hungary; G. Sz. Agejev; I. A. Alekszejev, both of Moscow, U.S.S.R.

[73] Assignees: Tyeploelektroprojekt, Moscow, U.S.S.R.; Transelektro Magyar Villamossagi Kulkereskedelmi Vallalat, Budapest, Hungary

[22] Filed: Oct. 20, 1972

[21] Appl. No.: 299,501

[30] Foreign Application Priority Data
Oct. 25, 1971 U.S.S.R. .................................. 1710

[52] U.S. Cl. ............. 165/110; 60/688; 165/DIG. 1; 165/138
[51] Int. Cl. .............................................. F28b 3/04
[58] Field of Search ...... 165/110, 111, 122, DIG. 1, 165/138; 261/DIG. 11; 60/685-693

[56] References Cited
UNITED STATES PATENTS

| | | | |
|---|---|---|---|
| 3,495,655 | 2/1970 | Fordyce ........................ | 165/110 X |
| 3,635,042 | 1/1972 | Spangemacher ................ | 165/110 X |
| 3,731,488 | 5/1973 | Sasakura et al. ................ | 165/110 X |

OTHER PUBLICATIONS

Rossie, J. P. et al., *Dry Type Cooling Towers*, EPA Publication by GPO (16130EES 11/70), pp. 1, 113-116, 11/1970.

*Primary Examiner*—Albert W. Davis, Jr.
*Attorney, Agent, or Firm*—Blum, Moscovitz, Friedman & Kaplan

[57] ABSTRACT

Steam turbine power plants employ condensers for condensing the dead steam of the turbine. The required cooling in the condenser is obtained by cooling water which is, in case of dry cooling towers, injected into a mixing condenser. Recooling of the cooling water is obtained in surface heat exchangers of the dry cooling tower which carry off the heat by means of air.

Where the employment of such system is jeopardised by the hazards of climatic conditions, it is suggested to associate water cooled heat exchangers with the surface heat exchangers and the dry cooling tower of the system. Such water cooled heat exchangers serve as auxiliary means where the cooling effect of the surface heat exchangers of the dry cooling tower fails to ensure a desired low condensation temperature in the mixing condenser.

8 Claims, 5 Drawing Figures

CONDENSATION APPARATUS FOR STEAM TURBINE POWER PLANTS

This invention relates to condensation apparatus for steam turbine power plants.

It is known that efficiency of a turbine is the higher the lower is the condensation temperature of the exhausted steam withdrawing from the turbine. Condensers of steam turbine power plants are, as a rule, cooled by means of water or air. Cooling water will be taken from natural sources and discharged after traversing surface condensers of the turbine, or recirculated by a circulation pump. In the latter case, the water is cooled down in evaporation coolers such as cooling towers, spray apparatus or cooling lakes.

In the evaporation coolers one portion of the cooled-down water is evaporated while another portion thereof is carried off in the shape of droplets by the flowing air. In addition, a portion of the water is generally drained off in order to prevent an undesirable concentration of salt dissolved in the recirculated water. Such losses are made up by supplying water from natural sources into the cooling system.

Recently, air condensation apparatus (dry cooling towers) have considerably gained ground. Their cooling medium (a liquid) is recooled by air from the ambiency. Such apparatus comprises a mixing condenser into which a condensate is injected which previously was cooled down in surface heat exchangers by means of air. The surface heat exchangers, in turn, are built in in cooling towers and are operated with natural draught or with blowers (forced draught). Air condensation apparatus is, however, more expensive than systems cooled by water. In addition, in case of high ambient temperatures no sufficient efficiency of the turbine can be warranted. Their extended use is due to the lack of water at numerous places of the Earth.

On the other hand, with low air temperatures, the turbine efficiencies of air condensation systems yield exceedingly high turbine efficiencies.

Water shortages occur in certain years with little rainfall and in certain seasons with little precipitation. Such water shortages can become critical and depend on yearly or seasonal variations in the water flow.

Thus, for instance, the amount of water observable in rivers at medium degrees latitude during winter time increases suddenly in springtime and is maintained at a fairly high level during summer. It means that the water storage reservoirs will be filled up in springtime and during summer, and will, as a rule, hardly be used. During the hot seasons, the river beds are filled with water which originates from snow in the high mountains. In northern areas, on the other hand, numerous rivers will entirely freeze in winter time while the mightiest rivers yield but minimum amount of water. In contrast, during summer these rivers are exceedingly swollen. In such cases, it is economically preferably to cool the condensers of the turbine of power plants by air in winter time where the cold air permits to maintain a high turbine efficiency while, on the other hand, during summer, the condensers will be cooled, in addition to air, also by water at disposal. In the course of arid years where the amount of water at disposal is particularly little, it seems to be preferable to permit a slight decrease in the turbine efficiency and to use water only during hours in which the power plant has to yield a maximum performance and the temperature of the air is high.

Finally, it has been suggested to employ a surface condenser with a cooling tower the air inlet of which has pairs of superposed surface heat exchangers and open contact spray coolers arranged in it, wherein the water circulated through the surface condenser traverses first the surface heat exchanger and then the open contact spray cooler of each pair.

The above described combined systems require, wholly or partly, the employment of surface condensers made of expensive corrosion resistant materials in order to withstand various salts and oxygen contained in the water circulated therein since the condensate is liable to be contaminated in such condensers through sealings between pipe conduits and their armatures. This may have serious consequences. Moreover, condensers of this type have a considerable requirement of space whereby the outer dimensions of the machine halls of power plants become undesirably increased.

The first two of the aforesaid combined systems require at least four pipe conduits between the condenser and the cooling tower. Of these, two pipe conduits serve for supplying and withdrawing the cooling water while the other two pipe conduits are destined to conduct the condensate. Moreover, the pipe conduits are of considerable size while the pressure prevailing therein is smaller than the atmospheric pressure, whereby the danger of the condensate being contaminated is considerably increased.

The air inlet passages of the combined cooling tower have to be equipped with clumsy apparatus for adjusting the amount of air supplied through the surface heat exchangers and the contact spray coolers into the cooling tower. The dimensions of the cooling towers operated with natural draught or the performance of blowers arranged in cooling towers operated with forced draught have to be considerably greater and higher, respectively, than with conventional evaporation cooling towers since very large amounts of air are required for the cooling of surface heat exchangers by means of convection, in addition to the amounts of air by which the heat is withdrawn from the contact spray coolers by means of convection and evaporation.

The main object of the present invention is to obviate the deficiencies of the known systems. For this purpose, a mixing condenser is provided for the turbine and the condensate is cooled down by means of air cooled surface heat exchangers in a manner known per se. Such condensation apparatus is distinguished from the above described combined systems by that downstream of or in parallel connection to the air cooled surface heat exchangers, a water cooled condensate cooler is employed in the form of a surface heat exchanger in the pipes of which the cooling water is circulated while outside the pipes the condensate to be cooled down is passed.

The water cooled condensate cooler may be disposed e.g. within a cooling tower of natural draught.

The dimensions of the air operated cooler for the condensate, viz. the dimensions of the heat exchangers and the air supply means will preferably be selected so that in case of maximum performance of the power plant a suitably low condensation temperature may be maintained in winter time without the necessity of introducing cooling water operated cooler of the condensate. Since in case of air temperatures below zero a condiserable difference between the temperatures of the condensate and the air may be permitted in the range of 35° to 45° centigrade, without decrease of the turbine performance, suitable dimensions of the air operated condensate cooler will be substantially smaller than in case of known air condensation apparatus which are sized, as a rule, for a yearly average air temperature.

Cooling water will be introduced into the water operated cooler of the condensate in case of higher air temperatures where the air operated cooler is unable to maintain a temperature suitably low for the condensation of exhaust steam withdrawing from the turbine. Water will not be used for cooling purposes even at air temperatures above zero is the power plant is operated at less than full load which is the case e.g. during night hours or days of rest.

The flow rate of the cooling water is adjusted automatically dependent on the temperature of the condensate or on the pressure prevailing in the condenser of the turbine of the power plant.

Thus, the condensation apparatus according to the invention permits to maintain high turbine efficiencies while using minimum amounts of cooling water the supply of which is adjusted and controlled in dependence on weather conditions and power plant loads.

Cooling water may be taken from external sources such as rivers, lakes, channels. If even in summer time no suitable amounts of cooling water may be taken from external sources, an evaporation water cooler apparatus such as a cooling tower, a contact spray basin or a cooling lake will be employed. The water supply of the water operated cooler for the condensate is controlled in accordance with the steam condensation temperature in dependence on weather conditions and power plant loads in such a manner that water losses in the evaporation cooler are possibly low while turbine efficiency is suitably high.

Furthermore, in accordance with the present invention, the contact spray apparatus or the evaporation water cooler as well as the surface heat exchanger of the air operated cooler for the condensate are disposed within the frame of a cooling tower of natural draught whereby both expenses and space requirement are suitably decreased.

The invention will be described hereinafter in greater details by taking reference to the accompanying drawings which show, by way of example, connection diagrams of various embodiments of the condensation apparatus to the invention. In the drawings.

Same reference characters refer to similar details throughout the drawings.

Figure 1:
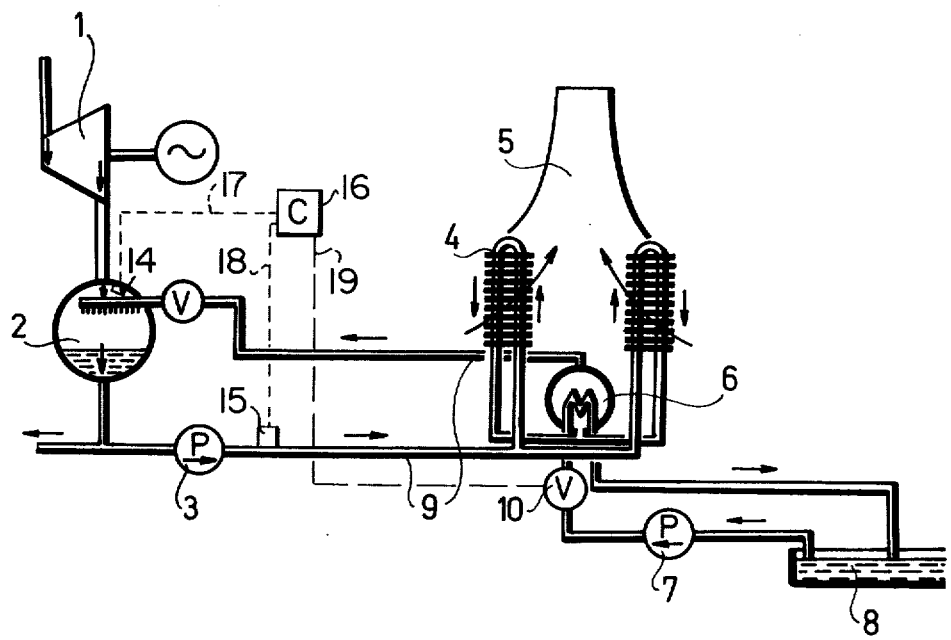
FIG. 1 is a diagrammatic view illustrating an embodiment of the condensation apparatus according to the invention.

In the drawings, FIG. 1 represents an exemplified embodiment of the condensation apparatus according to the invention in which a steam turbine 1 of a power plant is connected to a mixing condenser 2 which, in turn, is connected by means of a condensate conduit 9 with dry or air operated heat exchangers 4 connected in series with wet heat exchangers 6. The conduit 9 comprises a circulation pump 3 by means of which condensate is circulated through the mixing condenser 2 and the series connections of dry heat exchangers 4 and wet heat exchangers 6.

Reference character 5 refers to a cooling tower operated with natural draught in a manner known per se, the dry heat exchangers 4 being located at the bottom of the cooling tower 5.

The wet heat exchanger 6 is operated by cooling water taken from an external source 8 of such water furnished by a circulation pump 7 through a valve 10 for controlling the flow rate of water through the wet heat exchanger 6.

In operation, dead steam coming from turbine 1 is supplied into mixing condenser 2 where it is condensed by injected condensate and pumped by circulation pump 3 along the condensate conduit 9 into the series connected heat exchangers 4 and 6, respectively. The recooled condensate flows back into the mixing condenser 2 through an unspecified control valve where it is injected in the form of a spray whereby the dead steam coming from the turbine 1 is condensed, and so on.

It will be apparent that wet heat exchanger 6 may be disconnected from the system whenever its services can be dispensed with as will be the case at very low air temperatures or with restricted loads of the power plant.

For intermediate loads and air temperatures, pressure sensor 14 in mixer-condensor 2 transmits the pressure reading through line 17 to controller 16, and temperature sensor 15 transmits the condensate temperature through line 18 to controller 16. Controller 16 is connected to adjustable valve 10 through line 19 to bring liquid-operated cooler 6 into service, if necessary, and at the required rate of flow of cooling liquid, as determined by the information derived from said sensors.

Figure 2:
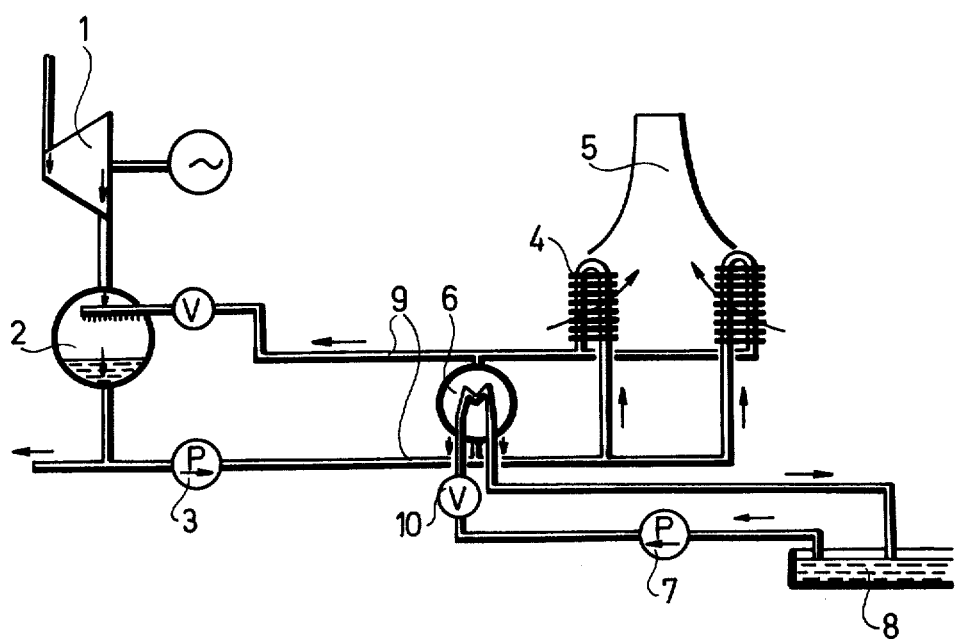
FIG. 2 is a diagrammatic view illustrating a second embodiment according to the invention.

FIG. 2 represents an embodiment by way of example in which the dry heat exchangers 4 and the wet heat exchangers 6 are arranged in parallel connection. A portion of the condensate flows here from the mixing condenser 2 through the heat exchangers 4 in which it is cooled by means of air flowing upwards in the cooling tower 5 as suggested by curved arrows. Another portion of the condensate is circulated through the wet heat exchangers 6 wherein it is cooled by the cooling water taken from the external source 8 as was the case with the previous embodiment. Subdivision of the water amount between the various heat exchangers is controlled by suitable valves not shown.

Again, it will be seen that the wet heat exchanger 6 may be disconnected from the system whenever its services may be dispensed with without the operation of the recooling system being impaired.

Figure 3:
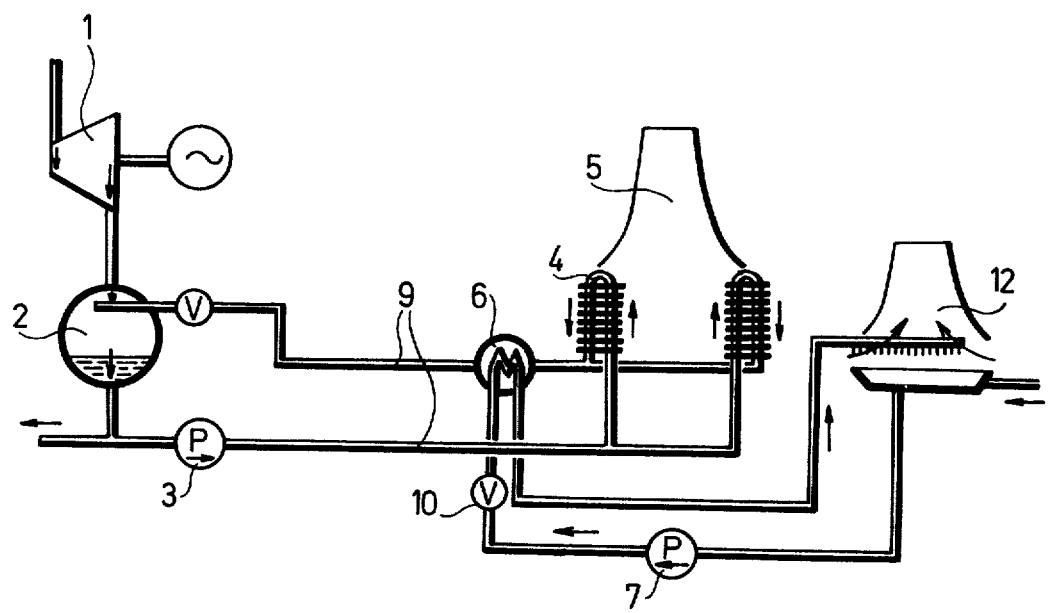
FIG. 3 is a diagrammatic view illustrating a third embodiment of the invention.

FIG. 3 represents an exemplified embodiment wherein the cooling water for the wet heat exchangers 6 is recooled by a further cooling tower 12.

Water losses in this tower caused by evaporation and by the air flow which carries away water particles are made up by taking water from an external water source not shown but indicated by an arrow. This external water source will serve also for making up water losses which will arise whenever the water is drained from the circulation system in order to prevent undesired increase of concentration in salts which are dissolved in the water.

In the instant case, a cooling tower 12 operated with natural draught has been shown. It will, however, be apparent that cooling towers with forced draught e.g. by means of blowers or ventilators or spray water basins and cooling lakes might be employed as well.

Figure 4:
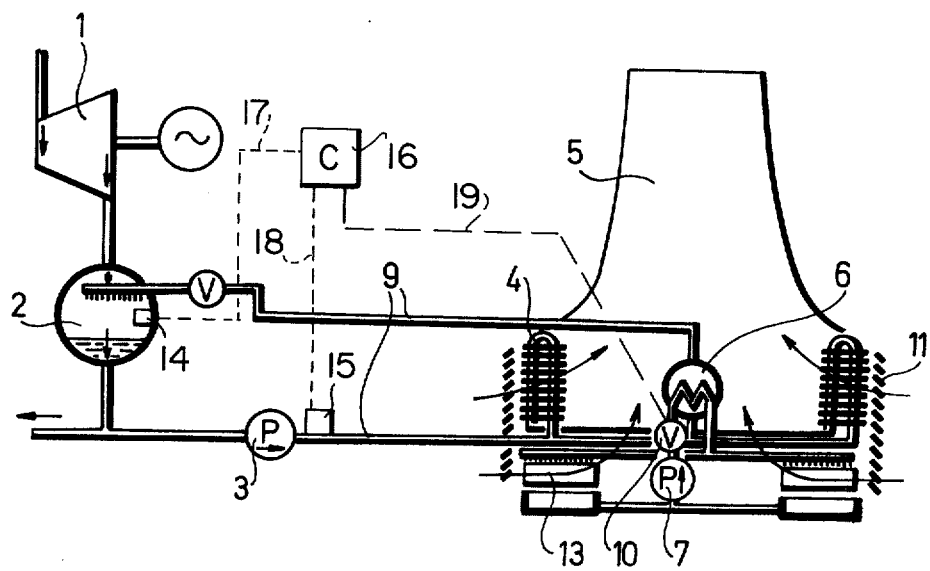
FIG. 4 is a diagrammatic view illustrating a fourth embodiment of the invention.

The exemplified embodiment shown in FIG. 4 differs from the previous one by that the water operated heat exchanger 6 has a contact spray cooler 13 which is, together with the air operated heat exchanger 4 for the condensate disposed within the air inlet passage of the cooling tower 5 of natural draught, the air operated heat exchanger 4 being arranged above the contact spray cooler 13. Division of the air flow between the heat exchangers 4, 6 and the spray cooler 13 is obtained by means of flap valves louvers 11.

In operation, upon increase of the amount of water supplied into the contact spray cooler 13 the amount of air traversing the same is likewise increased while upon cutting off the water supply into the spray cooler also the air flow will be interrupted.

Figure 5:
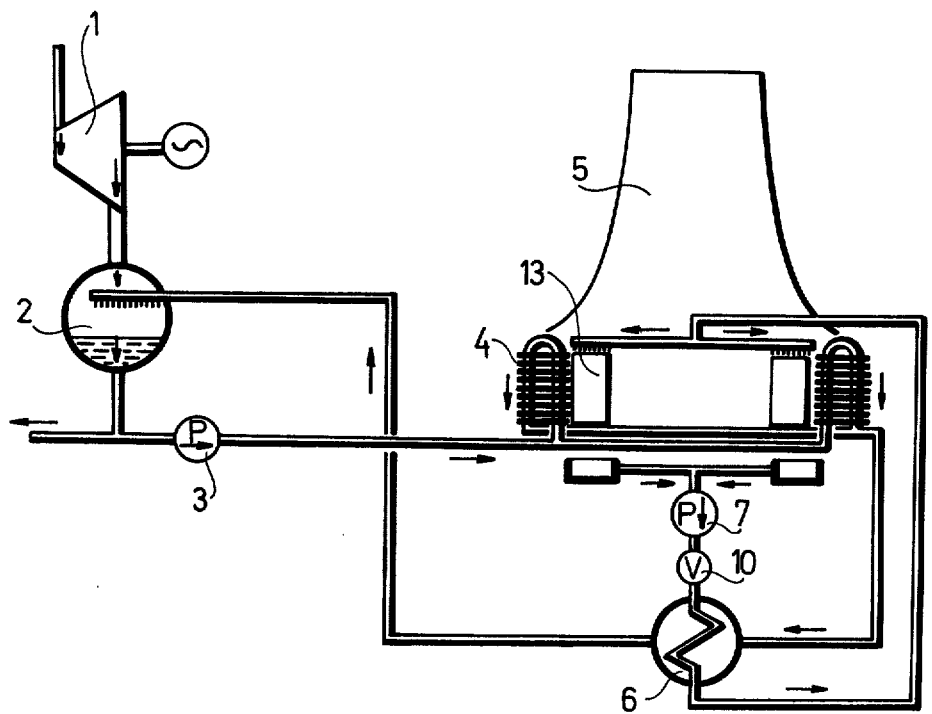

The exemplified embodiment of the invention shown in FIG. 5 illustrataes a condensation apparatus in which the contact spray cooler 13 of the water operated heat exchanger 6 is connected in series downstream the air operated heat exchanger 4 for the condensate as regards the air flow. With such embodiment, a control of the air flow may be dispensed with.

What we claim is:

1. A condensation apparatus for steam turbine power plants comprising, in combination, a mixing condenser; a cooling system for cooling condensate withdrawn from said mixing condenser; first conduit means connecting said mixing condenser and said cooling system for flow of condensate from said condenser to said cooling system; second conduit means connecting said cooling system to said mixing condenser for flow of cooled condensate from said system to said condenser; first circulating pump means in one of said first and second conduits; said cooling system including an air-operated cooler incorporating a heat exchanger, an air supply means having an inlet passage, a liquid-operated cooler incorporating a heat exchanger, third conduit means connected for transferring condensate from said first conduit means through said air-operated cooler and said liquid-operated cooler to said second conduit means, and second circulating pump means for circulating coolant liquid from an outside source through said liquid-operated cooler; sensors for determining the condensate temperature and the pressure in said mixing condenser; an adjustable valve positioned for adjusting the flow of coolant liquid to said liquid-operated cooler; and control means for receiving information from said sensors and adjusting said valve for optimum flow of coolant liquid in accordance with the information received.

2. A condensation apparatus as claimed in claim 1, wherein said air supply means is a cooling tower.

3. A condensation apparatus as claimed in claim 2 wherein said cooling tower is arranged for natural draught.

4. A condensation apparatus as claimed in claim 2 wherein said cooling tower is arranged for forced draught.

5. A condensation apparatus as claimed in claim 1 the further improvement of the heat exchanger of the liquid operated cooler being provided with a contact spray cooler arranged below the heat exchangers of the air operated cooler in the air inlet passage of said air supply means, said air inlet being provided with control means for adjusting the rate of airflow therethrough.

6. A condensation apparatus as claimed in claim 1 the further improvement said liquid operated cooler having contact liquid spray coolers associated with it, said contact liquid spray coolers and said heat exchangers of said air operated coolers being arranged behind one another in the air inlet passage of said air supply means.

7. In a condensation apparatus as claimed in claim 1 the further improvement of said apparatus being provided with a control valve for adjusting and interrupting the introduced amount of cooling dependent on the condensate temperature and the pressure prevailing in said mixing condenser.

8. The condensation apparatus as claimed in claim 1 further comprising a second air-operated cooler connected with said liquid-operated cooler for cooling said coolant liquid.

* * * * *